(12) United States Patent
Eschenmoser et al.

(10) Patent No.: US 11,313,491 B2
(45) Date of Patent: Apr. 26, 2022

(54) VACUUM VALVE WITH INERTIAL SENSOR

(71) Applicant: VAT HOLDING AG, Haag (CH)

(72) Inventors: Adrian Eschenmoser, Grabs (CH);
Andreas Hofer, Widnau (CH)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 16/627,224

(22) PCT Filed: Jun. 28, 2018

(86) PCT No.: PCT/EP2018/067464
§ 371 (c)(1),
(2) Date: Dec. 27, 2019

(87) PCT Pub. No.: WO2019/002489
PCT Pub. Date: Jan. 3, 2019

(65) Prior Publication Data
US 2020/0224788 A1 Jul. 16, 2020

(30) Foreign Application Priority Data

Jun. 30, 2017 (EP) .................................... 17179083

(51) Int. Cl.
*F16K 37/00* (2006.01)

(52) U.S. Cl.
CPC ................ *F16K 37/0041* (2013.01)

(58) Field of Classification Search
CPC .... F16K 37/0041; F16K 51/02; F16K 3/0254; F16K 3/18; G01L 5/00; G01M 99/00
USPC ........................................................ 137/554
See application file for complete search history.

(56) References Cited

U.S. PATENT DOCUMENTS

| 2,850,260 | A | * | 9/1958 | Perazone | F16K 31/523 |
| | | | | | 251/169 |
| 3,145,969 | A | | 8/1964 | Von Zweck | |
| 4,052,036 | A | * | 10/1977 | Schertler | F16K 3/184 |
| | | | | | 251/144 |
| 4,785,844 | A | * | 11/1988 | Pankov | F16K 3/184 |
| | | | | | 137/240 |
| 5,577,707 | A | | 11/1996 | Brida | |
| 6,056,266 | A | | 5/2000 | Blecha | |
| 6,089,537 | A | | 7/2000 | Olmsted | |
| 6,328,051 | B1 | * | 12/2001 | Maher | F16K 3/06 |
| | | | | | 137/1 |
| 6,409,149 | B1 | * | 6/2002 | Maher, Jr. | F16K 3/06 |
| | | | | | 251/187 |
| 6,416,037 | B1 | | 7/2002 | Geiser | |

(Continued)

FOREIGN PATENT DOCUMENTS

| CN | 101109451 A | 1/2008 |
| CN | 106704614 A | 5/2017 |

(Continued)

OTHER PUBLICATIONS

International Search Report and Written Opinion dated Jun. 28, 2018 in International Application No. PCT/EP2018/067464.

*Primary Examiner* — Angelisa L. Hicks
(74) *Attorney, Agent, or Firm* — Muncy, Geissler, Olds & Lowe, P.C.

(57) ABSTRACT

Disclosed is a vacuum valve with a sensor arrangement having at least one inertial sensor, where the sensor arrangement is designed in such a way it detects a measuring signal with respect to an acceleration impacting on the valve.

15 Claims, 3 Drawing Sheets

(56) References Cited

U.S. PATENT DOCUMENTS

Figure 3A:
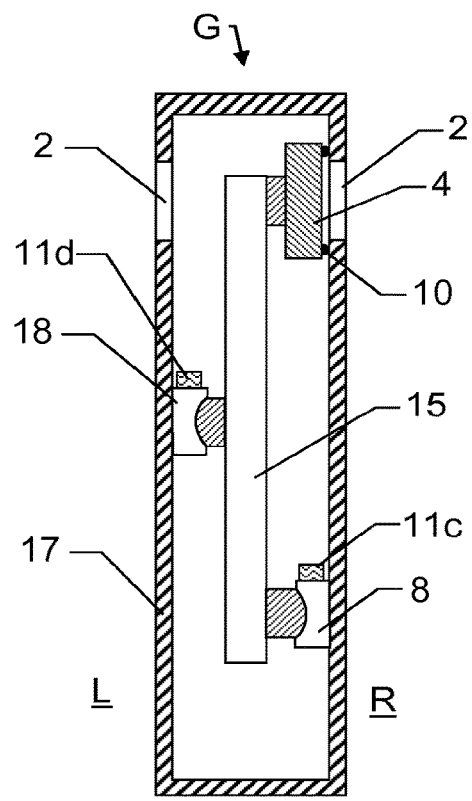

| | | | |
|---|---|---|---|
| 6,629,682 B2 | 10/2003 | Duelli | |
| 7,146,677 B2 * | 12/2006 | Litomisky | A47L 5/38 |
| | | | 15/301 |
| 2005/0067603 A1 | 3/2005 | Lucas et al. | |
| 2008/0111095 A1 | 5/2008 | Naitoh et al. | |
| 2015/0059455 A1 * | 3/2015 | Juds | G01L 5/0061 |
| | | | 73/114.18 |
| 2015/0362090 A1 | 12/2015 | Anderson et al. | |

FOREIGN PATENT DOCUMENTS

| | | |
|---|---|---|
| DE | 1264191 B1 | 3/1968 |
| DE | 77 31 993 U | 1/1978 |
| DE | 3447008 C2 | 6/1986 |

\* cited by examiner

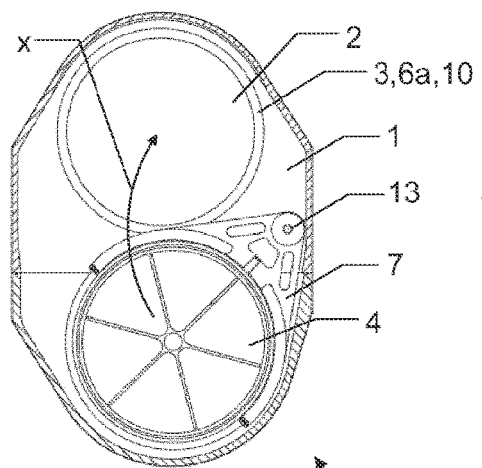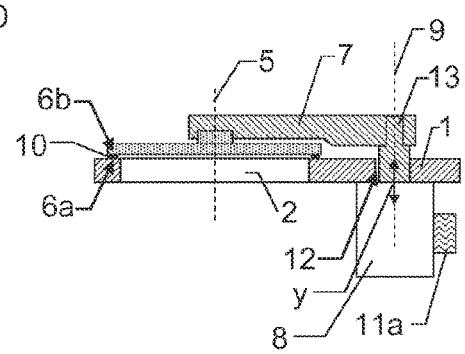
Fig.1a  Fig.1b
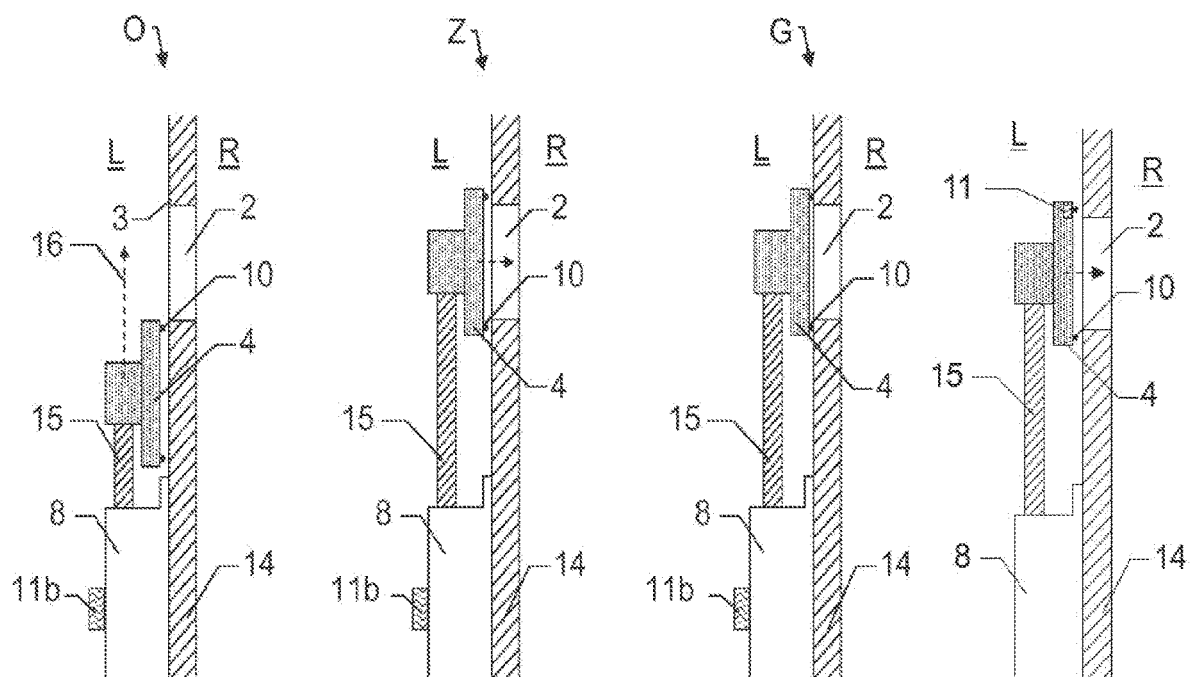
Fig.2a  Fig.2b  Fig.2c  Fig.2d

Fig.5b   Fig.5c   Fig.5d

VACUUM VALVE WITH INERTIAL SENSOR

This application is a 371 National Phase of PCT Application No. PCT/EP2018/067464, filed on Jun. 28, 2018; which claims priority to European Patent application 17179083.5 filed Jun. 30, 2017 and each of which is herein incorporated by reference in its entirety.

The invention relates to a vacuum valve having a sensor arrangement with at least one inertial sensor.

Vacuum valves for regulating a volume or mass flow and/or for essentially gas-tight closing of a flow path leading through an opening formed in a valve housing are generally known from the prior art in various embodiments and are used in particular in vacuum chamber systems in the area of IC, semiconductor or substrate production, which must take place in a protected atmosphere as far as possible without the presence of contaminating particles. Such vacuum chamber systems comprise in particular at least one evacuatable vacuum chamber which is provided for receiving semiconductor elements or substrates to be processed or produced and which has at least one vacuum chamber opening through which the semiconductor elements or other substrates can be guided into and out of the vacuum chamber, and at least one vacuum pump for evacuating the vacuum chamber. For example, in a production plant for semiconductor wafers or liquid crystal substrates, the highly sensitive semiconductor or liquid crystal elements pass sequentially through several process vacuum chambers in which the parts located within the process vacuum chambers are each processed by means of a processing device. Both during the machining process within the process vacuum chambers and during the transport from chamber to chamber, the highly sensitive semiconductor elements or substrates must always be in a protected atmosphere—especially in an airless environment.

For this purpose, peripheral valves are used to open and close a gas inlet or outlet and transfer valves are used to open and close the transfer openings of the vacuum chambers for inserting and removing the parts.

The vacuum valves through which semiconductor parts pass are referred to as vacuum transfer valves due to the area of application described and the associated dimensioning, as rectangular valves due to their mainly rectangular opening cross-section and also as slide valves, rectangular sliders or transfer slide valves due to their normal mode of operation.

Peripheral valves are used in particular to control or regulate the gas flow between a vacuum chamber and a vacuum pump or another vacuum chamber. For example, peripheral valves are located within a pipe system between a process vacuum chamber or a transfer chamber and a vacuum pump, the atmosphere or another process vacuum chamber. The opening cross-section of such valves, also known as pump valves, is generally smaller than that of a vacuum transfer valve. Peripheral valves are also called control valves because, depending on the application, they are not only used to completely open and close an opening, but also to control or regulate a flow by continuously adjusting the opening cross-section between a complete open position and a gas-tight closed position. A possible peripheral valve for controlling or regulating the gas flow is the pendulum valve.

In a typical pendulum valve, as known from U.S. Pat. No. 6,089,537 (Olmsted), for example, the first step is to rotate a normally round valve plate from a position that releases the opening to an intermediate position that covers the opening via an opening that is usually also round. In the case of a slide valve, as described for example in U.S. Pat. No. 6,416,037 (Geiser) or U.S. Pat. No. 6,056,266 (Blecha), the valve plate, as well as the opening, is usually rectangular and in this first step is pushed linearly from a position releasing the opening into an intermediate position covering the opening. In this intermediate position, the valve plate of the pendulum or slide valve is located at a distance from and opposite to the valve seat surrounding the opening. In a second step, the distance between the valve plate and the valve seat is reduced so that the valve plate and the valve seat are pressed evenly against each other and the opening is closed essentially gas-tight. This second movement preferably occurs in a direction substantially perpendicular to the valve seat. The sealing can either take place via a sealing ring arranged on the closure side of the valve plate, which is pressed onto the valve seat circumferential around the opening, or via a sealing ring on the valve seat, against which the closure side of the valve plate is pressed. Due to the closing procedure occurring in two steps, the sealing ring between the valve plate and the valve seat is hardly subjected to shear forces, which would destroy the sealing ring, since the movement of the valve plate in the second step takes place essentially linearly perpendicularly onto the valve seat.

Various prior art sealing devices are known, for example from the U.S. Pat. No. 6,629,682 B2 (Duelli). A suitable material for sealing rings and seals in vacuum valves is, for example, fluoro rubber, also known as FKM, in particular the fluoroelastomer known under the trade name "Viton", and perfluororubber, FFKM for short.

From the prior art, different drive systems are known to achieve this combination of a rotational movement of the valve plate of the pendulum valve and a translational movement of the valve plate of the slide valve parallel to the opening and a substantially translational movement perpendicular to the opening, for example from U.S. Pat. No. 6,089,537 (Olmsted) for a pendulum valve and from U.S. Pat. No. 6,416,037 (Geiser) for a slide valve.

The valve plate must be pressed against the valve seat in such a way that both the required gas tightness within the entire pressure range is ensured and damage to the sealing medium, in particular the sealing ring in the form of an O-ring, caused by excessive pressure loading is avoided. In order to guarantee this, well-known valves provide for pressure regulation of the valve plate which is regulated depending on the pressure difference prevailing between the two valve plate sides. Especially with large pressure fluctuations or the change from vacuum to overpressure, or vice versa, an even force distribution along the entire circumference of the sealing ring cannot always be guaranteed. In general, the aim is to decouple the sealing ring from support forces resulting from the pressure applied to the valve. In the U.S. Pat. No. 6,629,682 (Duelli), for example, a vacuum valve with a sealing medium is proposed, which consists of a sealing ring and an adjacent support ring, so that the sealing ring is essentially free of support forces.

In order to achieve the required gas tightness, possibly for both positive and negative pressure, some well-known pendulum valves or slide valves additionally or alternatively to the second movement step provide a valve ring which can be displaced perpendicularly to the valve plate, surrounds the opening and is pressed onto the valve plate to close the valve in a gas-tight manner. Such valves with valve rings that can be actively displaced relative to the valve plate are known, for example, from DE 1 264 191 B1, DE 34 47 008 C2, U.S. Pat. No. 3,145,969 (von Zweck), and DE 77 31 993 U. U.S. Pat. No. 5,577,707 (Brida) describes a pendulum valve with a valve housing having an opening and a valve plate that swivels parallel across the opening to control flow through the opening. A valve ring which surrounds the opening can be actively moved vertically in the direction of the valve plate by means of several springs and compressed air cylinders. A possible further development of this pendulum valve is proposed in US 2005/0067603 A1 (Lucas et al.).

Since the valves mentioned above are used, among other things, in the production of highly sensitive semiconductor elements in a vacuum chamber, a corresponding sealing effect must also be reliably guaranteed for such process chambers. For this purpose, the condition of the sealing material or a sealing surface in contact with the sealing material during compression is of particular importance. During the service life of a vacuum valve, wear of the sealing material or the sealing surfaces can typically occur.

To avoid a leak possibly resulting in this case or to keep the quality of the sealing at a sufficiently high level consistently, a valve closure is typically replaced or restored at specified time intervals. Such a maintenance cycle is usually dimensioned in this case based on the number of the opening and closing cycles to be expected in a certain period of time. The maintenance thus usually takes place as a precaution to be able to preclude the occurrence of a leak beforehand as much as possible.

Such a maintenance requirement is not limited to the sealing material or the valve plate alone but extends in particular to the valve seat, which forms a part of the vacuum valve corresponding to the valve plate. The structure of a sealing surface on the side of the valve seat, e.g. a groove embedded in the valve seat, is also affected by mechanical stress. Therefore, a structural change in the groove resulting from valve operation may also affect the seal. This, too, is usually done at appropriate maintenance intervals.

A disadvantage of this valve maintenance is its precautionary character. The parts affected by maintenance are usually renewed or replaced before their regular or actual life expires. Each such maintenance step usually means a certain downtime for a production process and an increased technical and financial effort. In sum, this means a stoppage in production at intervals that are shorter than necessary and more frequent than would be necessary at all.

The object of the invention is thus to provide an improved vacuum valve, which allows optimized valve maintenance and thus an improvement, i.e. a shortening of possible process stoppages.

It is a further object of the invention to provide such a valve system, using which a more reliable gas-tight seal of a process volume can be achieved, in particular wherein the quality of the seal is predictable.

These objects are solved by the realization of the characterizing features of the independent claims. Features which further develop the invention in an alternative or advantageous way can be found in the dependent patent claims.

According to the present invention, a vacuum valve and an inertial sensor are combined and are designed in such a way that monitoring of the vacuum valve can be performed by the combination. Time-dependent and/or frequency-dependent measurement signals can be acquired by the sensor, using which an item of state information with respect to the vacuum valve can in turn be derived.

The state of the vacuum valve can thus be monitored and progressively evaluated thereby. A maintenance or replacement time of individual components, for example, of the lubricating grease in the drive, can be determined by means of the data which can thus be generated.

For example, a failure of the leak-tightness of the valve can thus be extensively predicted and a countermeasure defined punctually with respect to time or location can be recommended or initiated. Maintenance intervals can thus be planned better and carried out more efficiently, wherein the process integrity is preserved and secured at the same time.

A vibration behavior of parts of the drive or an elastomeric sealing material, for example, can be considered to be relevant state information of the vacuum valve.

The invention relates to a vacuum valve, preferably a vacuum slide valve, a pendulum valve or a monovalve, for regulating a volume or mass flow and/or for gas-tight interruption of a flow path, having a valve housing, a valve seat which has a valve opening defining an opening axis and a first sealing surface circumferential around the valve opening, a valve closure, in particular a valve plate, which is designed for at least one of: regulating the volume or mass flow and/or for interrupting the flow path, and comprises a second sealing surface corresponding to the first sealing surface, a drive unit coupled to the valve closure, which is designed in such a way that the valve closure is variable and settable in a defined manner to provide respective valve opening states and is adjustable from an open position, in which the valve closure at least partially releases the valve opening, into a closed position, in which the second sealing surface is pressed in the direction of the first sealing surface and the valve opening is thus essentially closed gas-tight, and back again, wherein the vacuum valve furthermore comprises a sensor arrangement having at least one inertial sensor, wherein the sensor arrangement is designed to acquire a measurement signal with respect to an acceleration occurring on the valve.

The vacuum valve can moreover comprise a monitoring and control unit, which is designed to control the sensor arrangement and to adjust the valve closure between the open position and the closed position by means of the drive unit. An intervention can also be made on the basis of an analysis of the measurement signal in this controlled adjustment. Thus, for example, the process can be completely stopped ("emergency stop") or slowed, if accelerations which are irregular or excessively high in absolute value should occur in the system.

The monitoring and control unit can be designed to provide a frequency spectrum based on the measured values. In particular acceleration values plotted over time are recorded as measured values. A frequency spectrum may be derived therefrom if needed, which can change with the time (for example, travel during the valve closure).

The monitoring and control unit can furthermore be designed to provide an output signal with respect to locating of an oscillation causing the respective measured value frequency based on an analysis of the measured values with respect to one or more measured value frequencies. For example, this locating can be realized via the recognition of characteristic frequencies, for example, by lower frequencies indicating vibrations of larger components or externally introduced oscillations and high frequencies indicating vibrations of smaller components. Such characteristic frequencies can each be "learned" by corresponding test performances, in which the individual components are each excited, and can be used for the output signals as a recognition scheme.

The monitoring and control unit can also be designed to provide an output signal with respect to an evaluation of a process controlled by the vacuum valve based on a comparison of the measured values to predefined tolerance values. Thus, for example, a warning can be output as an output signal, which can include that accelerations which are excessively high with respect to absolute value occur in the system. In particular, such a warning can be output if the measured values or one measured value leaves or is tangent to a tolerance value range.

Furthermore, the monitoring and control unit can be designed to provide an output signal based on trend monitoring of measured values of multiple, in particular equivalent processes controlled by the vacuum valve, which comprises one or both of: a warning about elevated wear of a component of the vacuum valve, and a prediction about the durability of a component of the vacuum valve. A warning about elevated wear of a component of the vacuum valve could occur, for example, if it has been established in the scope of the trend monitoring that oscillation amplitudes within the system grow faster from process to process than at a tolerance growth rate. A prediction about the durability of a component of the vacuum valve could occur, for example, by a trend of an amplitude or oscillation growth established in the scope of the trend monitoring being determined from process to process or computed by interpolation, and the extension of such a trend being simulated up to a tolerance limit.

The monitoring and control unit can also be designed to determine a contact pressure force, with which the valve closure bears on the valve seat in the closed position, based on acceleration values measured in parallel to the opening axis during the closing procedure and at least one known strength value of the coupling component, in particular the modulus of elasticity or modulus of rigidity in conjunction with the dimensions of the coupling component. In particular, this can be performed by integrating the acceleration values, whereby a travel distance or a bending distance, respectively, can be ascertained, which can in turn be computed knowing the rigidity of the coupling component with respect to a force. The first contact between valve closure and valve seat in the closing procedure can be used, for example, as a starting point for the integration of the acceleration values. This first contact can also be acquired by the acceleration values. The sensor or sensors used for this purpose can be, for example, a rotation rate sensor and/or an acceleration sensor, which can each be arranged, for example, on the housing of the drive or on the coupling element (arm or rod).

The sensor arrangement can be arranged and designed in such a way that an acceleration is acquired by the measurement signal which results due to frictional oscillation on at least one of the locations mentioned hereafter: between at least one part of the seal and at least one part of the first sealing surface, and between at least one part of the seal and at least one part of the second sealing surface.

The sensor arrangement can be arranged and designed in such a way that an acceleration which results in the drive unit is acquired by the measurement signal. An acceleration located there can occur, for example, due to inadequate or aged grease lubrication, due to a gearing damage as transportation damage, or as a result of a crash. In general, the acceleration can be induced, for example, by elevated friction in the system, which in turn results due to abrasion or wear.

The sensor arrangement can be arranged and designed in such a way that an acceleration which acts externally on the vacuum valve is acquired by the measurement signal. In this manner, for example, earthquakes or work accidents occurring in the surroundings can be detected and measures can be proposed or carried out if necessary, for example, pausing the presently running process.

The sensor arrangement can be designed in such a way that at least one inertial sensor is arranged at least one of the locations mentioned hereafter: on a part of the valve seat which comprises at least a part of the first sealing surface, on a part of the valve closure which comprises at least a part of the second sealing surface, on the valve housing, and on a housing of the drive unit.

The sensor arrangement can comprise at least one of the inertial sensors mentioned hereafter: an acceleration sensor, which detects accelerations along at least one axis aligned in a defined manner, and a rotation rate sensor, which detects rotational velocities or rotational accelerations around at least one axis aligned in a defined manner. Multiple inertial sensors of different types can thus be arranged at different locations in or on the valve, i.e., for example, a gyroscope or a rotation rate sensor on a coupling component and an acceleration sensor on the drive housing. Very generally, an acceleration sensor detects accelerations along at least one linear axis, in particular three-dimensionally in the three spatial axes which are each perpendicular to one another.

The drive unit can be connected to the valve housing, and the valve closure can be coupled to the drive unit via a coupling component. The coupling component can bear on a support element connected to the valve housing for controlled guiding of the coupling component.

The vacuum valve can define a vacuum region separated from an external environment, and inertial sensors of the sensor arrangement contributing to the measurement signal can be arranged outside the vacuum region.

The valve seat can be formed by a part of the vacuum valve, in particular wherein the valve seat is formed on a housing of the vacuum valve, or can be provided by a process chamber, in particular a chamber housing.

The vacuum valve according to the invention is described in more detail below solely by way of example by means of embodiment examples schematically shown in the drawings. The same elements are marked in the figures with the same reference numerals. As a rule, the embodiments described are not to scale and are not to be understood as limitations.

Figure 4A:
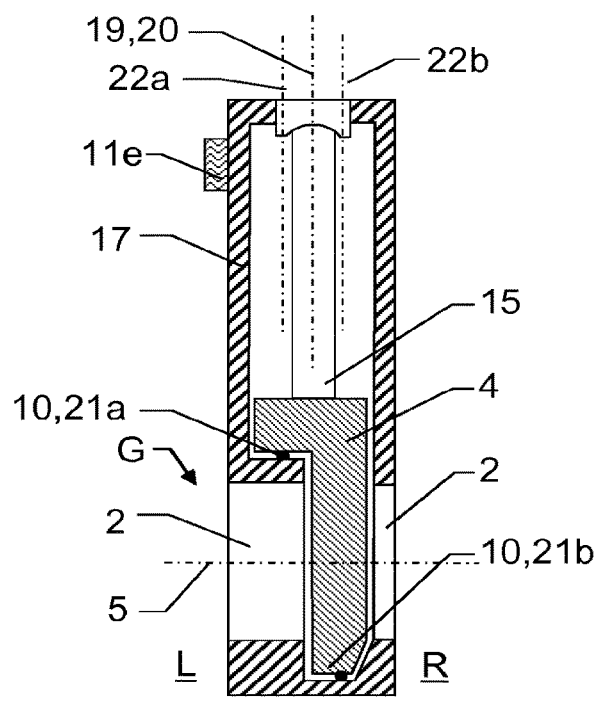

The figures show in detail:

FIGS. 1*a, b* show a possible embodiment of a vacuum valve according to the invention as a pendulum valve;

FIGS. 2*a-d* show a possible embodiment of a vacuum valve according to the invention as a transfer valve;

FIGS. 3*a, b* show a schematic illustration of a sensor arrangement according to the invention in a transfer valve having two inertial sensors;

FIGS. 4*a, b* show a schematic illustration of a further sensor arrangement according to the invention in a monovalve;

FIGS. 5*a-e* show a schematic illustration of a vacuum valve adjustment, acceleration measured values recorded in this case, and an exemplary analysis of the measured values.

FIG. 1*a* and FIG. 1*b* schematically show a possible embodiment of the valve according to the invention in the form of a pendulum valve. The valve for substantially gas-tight interruption of a flow path has a valve housing 1, which comprises an opening 2. The opening 2 has a circular cross-section here, for example. The opening 2 is enclosed by a valve seat 3. This valve seat 3 is formed by a sealing surface 6*a*, which faces axially in the direction of a valve plate 4, extends transversely in relation to the opening axis 5, has the shape of a circular ring, and is formed in the valve housing 1. The valve plate 4 is pivotable and is adjustable substantially parallel to the opening axis 5. In a closed position G (FIG. 1*b*) of the valve plate 4, the opening 2 is closed gas-tight by means of the valve plate 4. An open position O of the valve plate 4 is illustrated in FIG. 1a.

The valve plate 4 is connected via an arm 7 (coupling component), which is arranged laterally on the plate and extends perpendicularly in relation to the opening axis 5, to a drive 8 (motor). In the closed position G of the valve plate 4, this arm 7 is located outside the opening cross-section of the opening 2 geometrically projected along the opening axis 5.

The drive 8 is designed by use of a corresponding gearing in such a way that the valve plate 4—as is routine in a pendulum valve—is pivotable by means of a transverse movement x of the drive 8 transversely in relation to the opening axis 5 and substantially parallel over the cross-section of the opening 2 and perpendicularly in relation to the opening axis 5 in the form of a pivot movement around a pivot axis 9 between an open position O and an intermediate position and is linearly displaceable by means of a longitudinal movement y of the drive 8 taking place parallel to the opening axis 5. In the open position O, the valve plate 4 is positioned in a dwell section arranged laterally adjacent to the opening 2, so that the opening 2 and the flow path are released. In the intermediate position, the valve plate 4 is positioned spaced apart above the opening 2 and covers the opening cross-section of the opening 2. In the closed position, the opening 2 is closed gas-tight and the flow path is interrupted, by a gas-tight contact existing between the valve closure 4 (valve plate) and the sealing surface 6a of the valve seat.

To enable automated and regulated opening and closing of the valve, the valve provides, for example, an electronic regulating and control unit (monitoring and control unit), which is designed and is connected to the drive 8 in such a way that the valve plate 4 is adjustable accordingly for closing off a process volume in a gas-tight manner or for regulating an internal pressure of this volume. For example, the monitoring and control unit is integrated into the housing of the drive 8 or is relocated via data cable connection.

In the present exemplary embodiment, the drive 8 is designed as an electric motor, wherein the gearing can be switched over in such a way that driving of the drive 8 causes either the transverse movement x or the longitudinal movement y. The drive 8 and the gearing are electronically activated by the regulator. Such gearings, in particular having gate-type shifting, are known from the prior art. Furthermore, it is possible to use multiple drives to effectuate the transverse movement x and the longitudinal movement y, wherein the control takes over the activation of the drives.

The precise regulating and/or setting of the flow rate using the described pendulum valve is possible not only by way of the pivoting adjustment of the valve plate 4 between the open position O and the intermediate position by means of the transverse movement x, or rather above all by linear adjustment of the valve plate 4 along the opening axis 5 between the intermediate position and the closed position by means of the longitudinal movement y. The described pendulum valve can be used for precise regulating tasks.

Both the valve plate 4 and also the valve plate 3 each have a sealing surface 6a, 6b—a first and a second sealing surface. The first sealing surface 6a moreover comprises a seal 10. This seal 10 can be vulcanized as a polymer onto the valve seat 3 by means of vulcanization, for example. Alternatively, the seal 10 can be embodied, for example, as an O-ring in a groove of the valve seat 3. A sealing material can also be adhesively bonded on the valve seat 3 and thus embody the seal 10. In an alternative embodiment, the seal 10 can be arranged on the side of the valve plate 4, in particular on the second sealing surface 6b. Combinations of these embodiments are also conceivable.

The valve plate 4 is variably set, for example, on the basis of control variables and an output control signal. An item of information about a present pressure status in a process volume connected to the valve is obtained as an input signal, for example. Moreover, a further input variable, for example, a mass feed flow into the volume, can be provided to the regulator. A regulated setting of the valve over the time of a regulating cycle then takes place on the basis of these variables and on the basis of a predetermined target pressure, which is to be set and/or achieved for the volume, so that a mass drain flow out of the volume can be regulated over time by means of the valve. For this purpose, a vacuum pump is provided behind the valve, i.e., the valve is arranged between the process chamber and the pump. A desired pressure curve can thus be adjusted.

By way of the setting of the valve closure 4, a respective opening cross-section is set for the valve opening 2 and thus the possible gas quantity is set which can be evacuated per unit of time out of the process volume. The valve closure 4 can have a shape deviating from a circular shape for this purpose, in particular to achieve the most laminar possible media flow.

To set the opening cross-section, the valve plate 4 is adjustable by the regulating and control unit by means of the transverse movement x of the drive 8 from the open position O into the intermediate position and by means of the longitudinal movement y of the drive 8 from the intermediate position into the closed position. To completely open the flow path, the valve plate 4 is adjustable by the controller by means of the longitudinal movement y of the drive 8 from the closed position into the intermediate position and from there by means of the transverse movement x of the drive 8 from the intermediate position into the open position O.

The pressing of the valve plate 4 against the valve seat 5 has to take place in such a way that both the required gas-tightness is ensured inside the entire pressurized region and also damage to the seal 10 due to excessively large pressure strain is avoided. To ensure this, known valves provide a contact pressure regulation of the valve plate 4 regulated as a function of the pressure difference prevailing between the two valve plate sides.

In particular in the case of large pressure variations or the change from partial vacuum to overpressure, or vice versa, however, a uniform force distribution cannot always be ensured during a regulating process, i.e., a variation of the opening cross-section. Depending on the valve strain, the seal 10 (the sealing material), the valve plate 4, and the sealing surfaces 6a, 6b are thus strained differently, for example, whereby, for example, variable effective maintenance intervals result depending on the valve strain.

In the prior art, a valve closure is typically replaced and/or renewed at fixed time intervals as a precaution to avoid a possibly occurring leakage or to keep the quality of the seal at a sufficiently high level consistently. This has the disadvantage, among other things, that valve parts are usually renewed or replaced before the passage of the regular or actual service life thereof.

According to the present invention, the vacuum valve comprises a sensor arrangement having at least one inertial sensor, in the example shown an acceleration sensor 11a on the housing of the drive unit 8, whereby, for example, monitoring of seal wear of the vacuum valve or monitoring of the drive unit can take place.

For example, by means of the inertial sensor 11a, a frictional oscillation between one of the sealing surfaces 6a, 6b corresponding to one another and the seal 10 located between the sealing surfaces 6a, 6b can be acquired independently of the pressure variations of the process chamber or the wear of the other components. These and other oscillations can thus be acquired over a process duration, for example, in real time. In particular, such recordings are collected over multiple processes and analyzed in the scope of trend monitoring. A course of the seal wear can thus be monitored and the maintenance intervals can thus be dynamically set in accordance with the actual wear.

Measurement signals can be acquired by means of the sensor arrangement and an item of state information of the vacuum valve with respect to an acceleration occurring on the valve can be derived on the basis of the signals. The behavior of the vacuum valve can thus be monitored and progressively evaluated.

In the example shown, the acceleration sensor 11a acquires, for example, an acceleration on the drive housing 8 in at least one translation, for example, normal to the housing surface. Oscillations which take place perpendicularly in relation to the opening axis 5 are thus recorded thereby. In particular, the sensor arrangement according to the invention is conceived in such a way that accelerations are detected in all three spatial directions, i.e., three-dimensionally. Alternatively or additionally, rotational velocities and/or accelerations can also be detected using one or more of the rotation rate sensors comprised by the sensor arrangement. The respective axes and their alignments can be configured as needed.

The origin of the recorded oscillations can be ascertained in each case by frequency and/or amplitude analysis thereof. Such locating is possibly based on experiential value or test recordings, in which the individual valve components are artificially excited.

Additionally or alternatively, an inertial sensor can also be provided on each of the components shown, wherein an analysis of the measured values is to be adapted accordingly.

Alternatively to a pendulum valve as shown, the vacuum valve according to the invention can be implemented using another vacuum valve type, for example, a flap valve, slide valve, or a so-called butterfly regulating valve. The valve according to the invention is designed in particular for use in the vacuum field. Furthermore, pendulum valves are also usable, whose closure can only be adjusted in one direction.

FIG. 2a to FIG. 2c schematically show one possible embodiment of the valve according to the invention in the form of a transfer valve, illustrated in different closure positions. The reference signs used in the preceding figures apply similarly here.

The transfer valve shown is a special form of a slide valve. The vacuum valve has a rectangular, plate-shaped closure element 4 (for example, valve plate), which comprises a sealing surface 6b for the gas-tight closing of an opening 2. The opening 2 has a cross-section corresponding to the closure element 4 and is formed in a wall 14. The opening 2 is enclosed by a valve seat 3, which in turn also provides a sealing surface 6a corresponding to the sealing surface 6b of the closure element 4. The sealing surface 6b of the closure element 4 extends circumferentially around the closure element 4 and carries a sealing material 10 (seal). In a closed position, the sealing surfaces 6a, 6b are pressed against one another and the sealing material is compressed between the two sealing surfaces 6a, 6b.

The opening 2 connects a first gas region L, which is located on the left of the wall 14, to a second gas region R on the right of the wall 14. The wall 14 is formed, for example, by a chamber wall of a vacuum chamber. The vacuum valve is then formed by an interaction of the chamber wall 14 with the closure element 4.

The closure element 4 is arranged on an adjustment arm 15, which is rod-shaped here, for example, and extends along a geometric adjustment axis 16. The adjustment arm 15 is mechanically coupled to a drive unit 8, by means of which the closure element 4 is adjustable in the first gas region L on the left of the wall 14 by adjustment of the adjustment arm 15 by means of the drive unit 8 between an open position O (FIG. 2a) via an intermediate position Z (FIG. 2b), into a closed position G (FIG. 2c).

In the open position O, the closure element 4 is located outside the projection region of the opening 2 and releases it completely, as shown in FIG. 2a.

By adjusting the adjustment arm 15 in the axial direction parallel to the adjustment axis 16 and parallel to the wall 4, the closure element 4 can be adjusted by means of the drive unit 8 from the open position O into the intermediate position Z.

In this intermediate position Z, the sealing surface 6b of the closure element covers the opening 2 and is located in a position spaced apart opposite to the sealing surface 6a of the valve seat 3 enclosing the opening 2, as shown in FIG. 2b.

By adjusting the adjustment arm 15 in the direction transverse in relation to the adjustment axis 16, i.e., for example, perpendicularly in relation to the wall 14 and the valve seat 3, the closure element 4 can be adjusted from the intermediate position Z into the closed position G (FIG. 2c).

In the closed position G, the closure element 4 closes the opening 2 in a gas-tight manner and separates the first gas region L from the second gas region R in a gas-tight manner.

The opening and closing of the vacuum valve are thus performed by means of the drive unit 8 by way of an L-shaped movement of the closure element 4 and the adjustment arm 15. The transfer valve shown is therefore also called an L-type valve.

A transfer valve as shown is typically provided for sealing off a process volume (vacuum chamber) and for loading and unloading the volume. Frequent changes between the open position O and the closed position G are the rule in the case of such a use. In this way, increased appearances of wear of the sealing surfaces 6a, 6b and the seal 10 can occur.

According to the invention, a sensor arrangement having at least one inertial sensor 11b is provided for acquiring a measurement signal with respect to an acceleration occurring on and/or in the valve, in particular an acceleration curve. The acquired measurement signal can thus be recorded and subsequently analyzed in particular in a time-dependent manner.

In the example shown, an inertial sensor 11b is arranged on the housing of the drive 8 and thus acquires, for example, oscillations caused by the drive. A failure of diverse components can be predicted by the sensor arrangement according to the invention during a process sequence, i.e., in particular a warning is made of excessively high accelerations (vibrations, oscillations, jerks) or unintended trends of such accelerations.

Figure 3B:
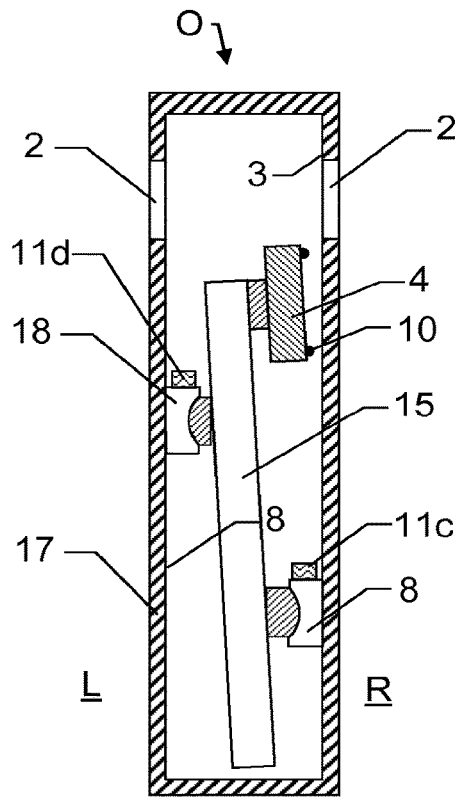

FIGS. 3a and 3b schematically show a further possible sensor arrangement in a transfer valve according to the invention, illustrated in a closed position G (FIG. 3a) and an open position O (FIG. 3b).

The reference signs used in the preceding figures apply similarly here. In the figures shown, the valve seat 3 is furthermore formed on a housing 17 of the vacuum valve.

However, it is clear to a person skilled in the art that the following description is applicable substantially similarly to embodiments, wherein the valve seat 3 is provided by a process chamber, i.e., a chamber housing.

Furthermore, it is self-evident that the valve mechanism shown here solely schematically as a tilting mechanism is not to be understood as restrictive and a person skilled in the art can transfer the sensor arrangement according to the invention, for example, in a similar manner to an arbitrary L-motion drive, for example, an L-motion drive having two linear adjustment directions of the valve plate perpendicular to one another.

For the controlled guiding of the adjustment arm 15, the vacuum valve here comprises, for example, a guide component 18, wherein the drive unit 8 and the guide component 18 are each in a fixed arrangement in relation to one another, here, for example, in that both the drive unit 8 and also the guide component 18 are each connected fixed in place to the valve housing 17. The adjustment arm 15 is furthermore mechanically coupled to the valve closure 4 and the drive unit 8, wherein by adjusting the adjustment arm 15, by means of the drive unit 8, the valve closure 4 is adjustable between the open position O and the closed position G substantially parallel to the valve seat 3, in particular in an L-motion movement as described in FIGS. 2a to 2d.

The sensor arrangement comprises by way of example the inertial sensors 11c and 11d and can be designed in such a way that the measurement signal acquires a stick-slip effect on one of the coupling components and/or in the drive 8. Frictional oscillations on the seal 10 could also be acquired using such a sensor arrangement, wherein an arrangement of an inertial sensor located closer to the seal is conceivable for this purpose, for example, on the valve housing 17.

The sensor arrangement shown in FIGS. 3a and 3b comprises two inertial sensors 11d, 11e, wherein, for example, an acceleration sensor 11d is provided on the guide component 18 and a gyroscope or rotation rate sensor 11e is provided on the drive unit 8. The arrangement thus enables in each case a direct acquisition of a rotational velocity or acceleration on the drive unit 8 and a translational acceleration on the guide component 18.

Thus, for example, an item of state information of the vacuum valve can be derived based on a target-actual comparison for the acquired measurement signal with respect to a known oscillation typically originating from the drive unit 8 (expressed in acceleration values). If the accelerations reach a value range which has previously been classified as critical, a warning signal can be provided.

Figure 4B:
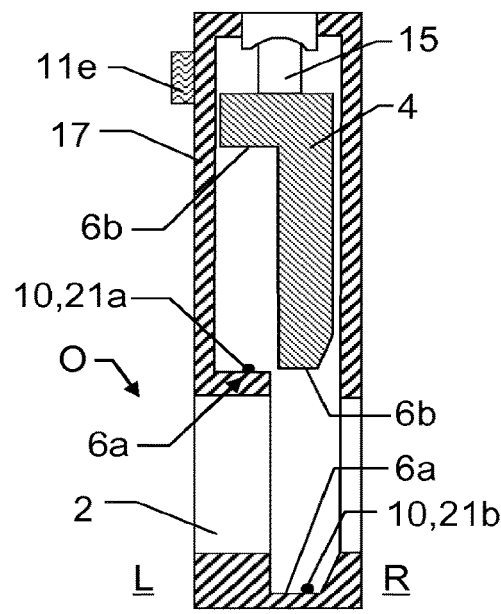

FIGS. 4a, 4b schematically show a further possible sensor arrangement, for example, in a so-called monovalve here, illustrated in a closed position G (FIG. 4a) and an open position O (FIG. 4b).

The valve for the gas-tight closing of a flow path by means of a linear movement comprises a valve housing 17 having an opening 2 for the flow path, wherein the opening 2 comprises a geometric opening axis 5 along the flow path. The closure element 4 is displaceable linearly along a geometric adjustment axis 18 extending transversely in relation to the opening axis 5 in a closure element plane 20 from an open position O, which releases the opening 2, into a closed position G, which is pushed linearly over the opening 2, in a closing direction and vice versa back in an opening direction.

For example, a curved first sealing surface 6a encloses the opening 2 of the valve housing 17 along a first section 21a in a first plane 22a and along a second section 21b in a second plane 22b. The first plane 22a and the second plane 22b are spaced apart from one another and extend parallel to one another and parallel to the closure element plane 20. The first section 21a and the opposing second section 21b therefore have a geometric offset in relation to one another transversely in relation to the adjustment axis 19 and in the direction of the opening axis 5. The opening 2 is arranged between the two opposing sections 21a and 21b in the region extending along the adjustment axis 19.

The closure element 4 comprises a second sealing surface 6b, which corresponds to the first sealing surface 6a and extends along sections corresponding to the first and second section 21a, 21b.

Monovalves, i.e., vacuum valves closable by means of a single linear movement, have the advantage, for example, of a comparatively simple closing mechanism, for example, compared to the transfer valves closable by means of two movements, which require a comparatively complexly constructed drive. Since the closure element can moreover be formed in one piece, it can be subjected to high acceleration forces, so that this valve can also be used for rapid closures and emergency closures. The closing and sealing can take place by means of a single linear movement, so that very rapid closing and opening of the valve is possible here.

In particular, one advantage of monovalves is that, for example, the seal is not subject to transverse strain in the transverse direction in relation to the longitudinal extension of the seal because of its course during closing. On the other hand, the seal is hardly capable because of its transverse extension in relation to the opening axis 5 of absorbing forces occurring on the closure element 4 along the opening axis 5, which can act on the closure element 4 in particular in the event of large differential pressure, which requires a robust construction of the closure element 4, its drive, and its mounting.

The sensor arrangement shown in FIGS. 4a and 4b comprises an inertial sensor 11e, arranged on the valve housing 17, for acquiring an acceleration, for example, along the adjustment axis 19, which follows, for example, from the adjustment of the closure element 4. The closure process can be checked for irregularities in this case.

Figure 5A:
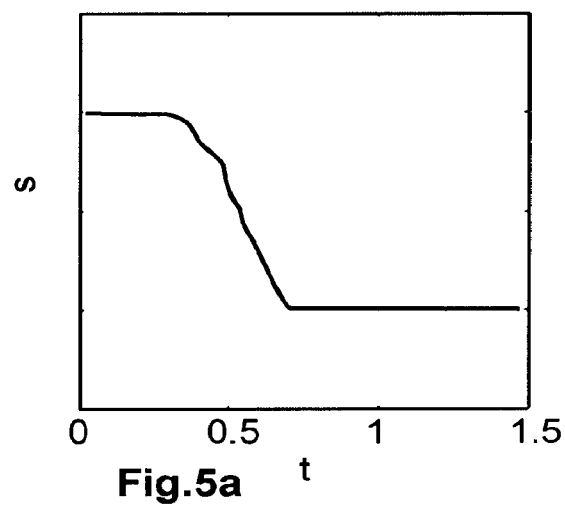
Figure 5E:
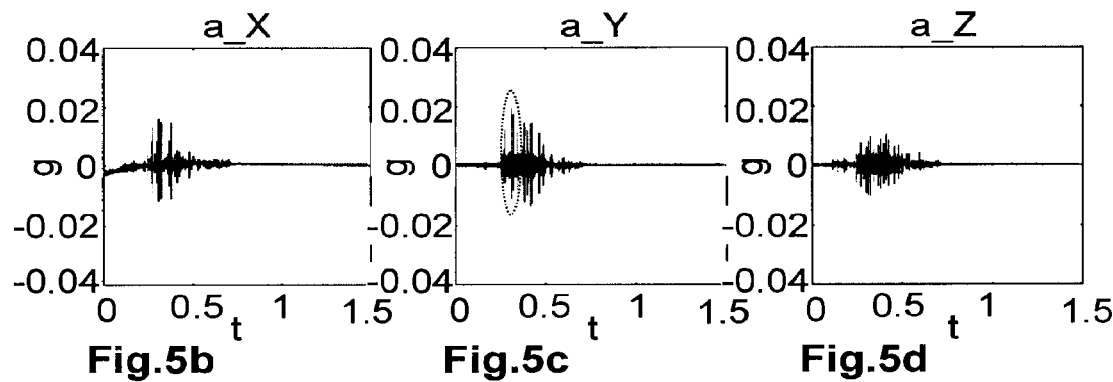
Figure 5E:
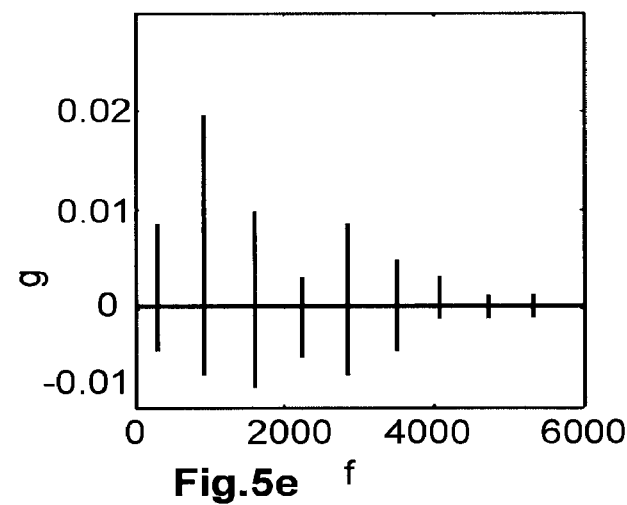

FIG. 5a shows an exemplary closure path of a vacuum valve according to the invention plotted over time. FIGS. 5b to 5d show accelerations in three spatial axes orthogonal to one another recorded during this closure process by one or more acceleration sensors. An exemplary analysis of the region enclosed by a dashed circle in FIG. 5c is shown in the frequency spectrum according to FIG. 5e. For example, individual components of the valve may be identified on the basis of the characteristic frequencies, whereby an evaluation can take place with respect to exceeding a predetermined or ascertained limiting amplitude.

The inertial sensors are, for example, piezoelectric acceleration sensors, which convert dynamic pressure variations into electrical measurement signals on the basis of piezoceramic sensor plates. A further example is silicon-based micro-electromechanical systems (MEMS), in which, for example, a deflection of "classic" spring-mass systems is measured electrically (via the capacitance).

A sensor arrangement according to the invention is configured to measure in an amplitude range of multiple gravitational accelerations (g) and at an amplitude resolution of up to $1/100,000$ g. An inertial sensor is always accelerated when a force acts thereon. For example, the sensor is positively accelerated when starting a movement in order to be negatively accelerated when decelerating the movement. Even minimal deflections (for example, during vibrations) can have large accelerations which the sensor can detect. Since vibrations can have high frequencies, for example, 52,000 samples per second are measured using the sensor (lower or higher frequencies are also possible and practical depending on the application). To evaluate these signals, the time-dependent measurements can be converted into a frequency-dependent signal (frequency spectrum). The sensor can effectuate this triaxially in particular. The state, for example, of the drive can be concluded on the basis of vibrations. It can thus be judged, for example, on the basis of a frequency spectrum whether a lubricating grease still has an adequate consistency or whether it already has appearances of age. It can also be detected in the system (for example, over multiple processes) whether the frequency spectrum changes, for example, due to wear, in particular abrasion in the drive unit, and/or a no longer acceptable level of wear has presumably occurred on the basis of an ascertained trend. Transportation damage, earthquakes, or crashes with the valve or nearby components in the process can also be ascertained (from the very first use), in particular wherein measures can be taken, for example, in the form of an emergency stop or a slowing of the process.

According to one embodiment of the invention, travel distances or deflection distances are computed from measured accelerations, in particular accelerations which were detected in a specific direction, by integral computation. Using the distance thus computed and the known rigidity (for example, modulus of elasticity, module of rigidity) of the rod 15 and/or the arm 7 (coupling component), a contact pressure force can be ascertained, which acts from the valve closure 4 on the valve seat 3. For example, the respective closure or opening phases of the valve mechanism can also be observed with a determination of the instantaneous total acceleration direction (vector formation from the acceleration values ascertained in the X, Y, and Z directions). The movement transversely in relation to the opening axis and the movement along the opening axis may thus be differentiated from one another in the measured values. The actual closure moment can also be detected, i.e., the point in time at which the valve closure strikes on the valve seat. In particular said deflection distance, which is used for the contact pressure force determination, can be ascertained from this closure moment. For example, the inertial sensor can be arranged as an acceleration sensor for this purpose on the rod 15 or the arm 7. The inertial sensor can also be arranged as a rotation rate sensor on the drive 8 or on one end of the rod 15 or the arm 7.

It is self-evident that these illustrated figures only schematically illustrate possible exemplary embodiments. The various approaches can also be combined with one another and with methods of the prior art.

The invention claimed is:

1. A vacuum valve for the regulation of a volume or mass flow and/or for the gas-tight interruption of a flow path, comprising
   a valve seat, which comprises a valve opening defining an opening axis and a first sealing surface circumferential around the valve opening,
   a valve closure, which is designed for at least one of:
      regulating the volume or mass flow,
      interrupting the flow path
   and comprises a second sealing surface corresponding to the first sealing surface,
   a drive unit coupled to the valve closure, which is designed such that the valve closure is variable and settable to provide respective valve opening states and is adjustable from an open position (O), in which the valve closure releases the valve opening, into a closed position (G), in which the second sealing surface is pressed in the direction of the first sealing surface and the valve opening is closed essentially gas-tight, and back again, wherein the vacuum valve furthermore comprises a sensor arrangement having one or more inertial sensors, wherein the sensor arrangement is designed to acquire a measurement signal with respect to an acceleration occurring on the valve, the acceleration being acquired independently of pressure variations in a process chamber,
   wherein the sensor arrangement is arranged such that the acceleration is acquired by the measurement signal, the acceleration corresponding to frictional oscillation on at least one of the locations of:
      between a part of a seal and a part of the first sealing surface, and
      between a part of the seal and a part of the second sealing surface.

2. The vacuum valve according to claim 1, wherein a monitoring and control unit, which is designed for controlling the sensor arrangement and adjusting the valve closure between the open position (O) and the closed position (G) by means of the drive unit.

3. The vacuum valve according to claim 2, wherein the monitoring and control unit is designed to provide a frequency spectrum based on the measured values.

4. The vacuum valve according to claim 2, wherein the monitoring and control unit is designed to provide an output signal with respect to locating of an oscillation causing the respective measured value frequency based on an analysis of the measured values with respect to one or more measured value frequencies.

5. The vacuum valve according to claim 2, wherein the monitoring and control unit is designed to provide an output signal with respect to an evaluation of a process controlled by the vacuum valve based on a comparison of the measured values to predefined tolerance values.

6. The vacuum valve according to claim 2, wherein the monitoring and control unit is designed to provide an output signal based on trend monitoring of measured values of multiple processes controlled by the vacuum valve, which output signal comprises one or both of:
   a warning about elevated wear of a component of the vacuum valve and
   a prediction about the durability of a component of the vacuum valve.

7. The vacuum valve according to claim 2, wherein the monitoring and control unit is designed to determine a contact pressure force, with which the valve closure bears on the valve seat in the closed position, based on acceleration values measured in parallel to the opening axis during the closing procedure and a known strength value of a coupling component.

8. The vacuum valve according to claim 1, wherein the sensor arrangement is designed and arranged in such a way that the acceleration which results in the drive unit is acquired by the measurement signal.

9. The vacuum valve according to claim 1, wherein the sensor arrangement is arranged such that the acceleration which acts from the outside on the vacuum valve is acquired by the measurement signal.

10. The vacuum valve according to claim 1, wherein the sensor arrangement is designed in such a way that an inertial sensor is arranged on at least one of the locations mentioned hereafter:
   on a part of the valve seat which comprises a part of the first sealing surface, on a part of the valve closure which comprises a part of the second sealing surface,
on a valve housing, or
on a housing of the drive unit.

11. The vacuum valve according to claim 1, wherein the sensor arrangement comprises inertial sensors selected from:
an acceleration sensor which detects accelerations along at least one axis aligned in a defined manner, and
a rotation rate sensor, which detects rotational velocities or rotational accelerations around at least one axis aligned in a defined manner.

12. The vacuum valve according to claim 1, wherein the drive unit is connected to the valve housing, and the valve closure is coupled to the drive unit via a coupling component.

13. The vacuum valve according to claim 1, wherein the vacuum valve defines a vacuum region separated from an external environment and inertial sensors of the sensor arrangement contributing to the measurement signal are arranged outside the vacuum region.

14. The vacuum valve according to claim 1, wherein the valve seat is formed by a part of the vacuum valve, or is provided by the process chamber.

15. The vacuum valve according to claim 1, wherein the frictional oscillation is detected for the seal independent of a wearing of other components of the vacuum valve.

* * * * *